US006732784B2

(12) United States Patent  (10) Patent No.: US 6,732,784 B2
Dion  (45) Date of Patent: May 11, 2004

(54) COOLING SYSTEM MODULE AND STRUCTURE FOR MOUNTING SAME IN A VEHICLE

(76) Inventor: Jacques Dion, 33, du Camarquais, Blainville (Quebec) (CA), J7C 4Z4

( * ) Notice: Subject to any disclaimer, the term of this patent is extended or adjusted under 35 U.S.C. 154(b) by 0 days.

(21) Appl. No.: 09/947,692

(22) Filed: Sep. 6, 2001

(65) Prior Publication Data

US 2002/0074104 A1 Jun. 20, 2002

Related U.S. Application Data

(60) Provisional application No. 60/230,275, filed on Sep. 6, 2000.

(51) Int. Cl.⁷ .............................. F28F 7/00; B60K 11/04
(52) U.S. Cl. .............................. 165/41; 165/67; 165/69; 180/68.4; 123/41.43
(58) Field of Search .............................. 165/41, 42, 67, 165/69; 180/68.4; 123/41.43

(56) References Cited

U.S. PATENT DOCUMENTS

| 3,788,419 | A | * | 1/1974 | Drone et al. ................ 180/68.4 |
| 5,291,961 | A | * | 3/1994 | Attinger et al. ............ 165/67 X |
| 6,073,594 | A | * | 6/2000 | Tsukiana et al. ........ 180/68.4 X |
| 6,298,908 | B1 | * | 10/2001 | Harrell et al. ................. 165/69 |
| 6,412,581 | B2 | * | 7/2002 | Enomoto et al. .......... 165/69 X |
| 6,457,543 | B1 | * | 10/2002 | Wooldridge ................ 180/68.4 |

* cited by examiner

Primary Examiner—Ljiljana Ciric
(74) Attorney, Agent, or Firm—Jansson, Shupe & Munger, Ltd.

(57) ABSTRACT

A cooling system support structure for removably supporting a cooling system module on a vehicle chassis is disclosed. The structure includes a frame having first and second sides and configured to support the cooling system module, first and second mounting points coaxially mounted along the first side and a third mounting point mounted along the second side. The mounting points are positioned to mate with corresponding chassis mounts on the vehicle chassis and a flexible coupling is provided for connecting each mounting point to the respective chassis mount such that the frame is movably supported by the vehicle chassis.

15 Claims, 11 Drawing Sheets

COOLING SYSTEM MODULE AND STRUCTURE FOR MOUNTING SAME IN A VEHICLE

RELATED APPLICATION

This application claims the benefit of U.S. Provisional Patent Application Ser. No. 60/230,275, filed Sep. 6, 2000.

FIELD OF THE INVENTION

This invention relates generally to vehicles, and in particular, to a modular cooling system and a structure for mounting the same in a frame of a vehicle such a bus.

BACKGROUND OF THE INVENTION

As is known, engines are used to propel vehicles such as buses, cars and the like. In order to prevent the engine of a vehicle from overheating, a cooling system is often interconnected thereto. The cooling system includes a radiator operatively connected to the engine such that coolant from the engine flows through the radiator. A heat exchange is effectuated between the coolant in the radiator and the outside, ambient air in order to remove heat from the coolant flowing through the radiator and back to the engine. A fan may be provided to blow air across the fins of the radiator in order to facilitate the heat exchange.

Radiators are often formed from a plurality of metal parts such as tubes and fins. Since the prior art radiators are often times rigidly connected to the vehicle chassis adjacent the engines of the vehicles, radiators see all of the vibrations associated with the operation of the vehicles. Due to these vibrations, stress may develop at certain points on the radiator resulting in the radiator cracking and/or breaking at such points. In addition, the chassis of a vehicle, such as a bus, is flexible. For example, the chassis will deflect as the bus travels along a road or receives passengers. This deflection of the chassis of the bus may be transmitted to the radiator of the vehicle as additional unwanted stress. Since replacement of a radiator is both labor intensive and expensive, it is highly desirable to provide a mounting structure for a cooling system which eliminates the stress points on a radiator during operation of the vehicle.

Depending on the type of vehicle, vehicle cooling systems may also contain additional components such as a radiator shroud, a transmission and/or other oil cooler, a heater core, a fan clutch, an expansion tank, and/or other items which may be necessitated by the application.

The installation and/or replacement of a cooling system for a vehicle is both time consuming and costly due to the fact that prior art cooling systems utilize numerous parts and sub-assemblies. Typically, individual cooling system components are installed essentially one at a time, making installation a very cost and time-inefficient process. Consequently, it is also highly desirable to provide a cooling system which may be quickly and easily installed in a vehicle.

OBJECTS OF THE INVENTION

Therefore, it is a primary object and feature of the present invention to provide a modular cooling system which may be quickly and easily installed in a vehicle.

It is a further object and feature of the present invention to provide a cooling system for a vehicle which may be mounted to the chassis of the vehicle at a location remote from the engine.

It is a still further object and feature of the present invention to provide a cooling system for a vehicle which is simpler and less expensive to manufacture than prior art cooling systems.

It is a further object and feature of the present invention to provide a mounting structure for a cooling system which eliminates the stress points on the cooling system during operation of the vehicle.

SUMMARY OF THE INVENTION

In accordance with the present invention, a cooling system module and a structure for mounting the same in a frame of a vehicle such as a bus is provided. The modular cooling system allows a user to install a single unit into the chassis of a vehicle thereby eliminating the time and labor associated with installation and/replacement of prior art cooling systems. The cooling system may include such items as a radiator, fan, fan drive, charged air cooler, transmission oil cooler, surge tank and/or other items which may be necessitated by the application.

A preferred embodiment of the present invention includes a cooling system support structure for removably supporting a cooling system module on a vehicle chassis, comprising a frame configured to support the cooling system module. The frame has a first side along which are coaxially mounted first and second mounting points and a second side on which a third mounting point is mounted. Each of these mounting points is positioned to mate with corresponding chassis mounts on the vehicle chassis. A flexible coupling connects each mounting point to the respective chassis mount such that the frame is movably supported by the vehicle chassis.

In a highly preferred embodiment, the mounting points of the support structure are positioned such that the cooling system module is supported in a balanced state. The term "balanced state" herein refers to the condition such that when the vehicle is generally level and not moving, the weight of the vehicle cooling system is approximately evenly distributed onto the three mounting points. This is accomplished by determining the placement of the cooling system components on the cooling system frame and by choosing the location of the mounting points on the cooling system frame. Mounting the cooling system to be in a balanced state allows each flexible coupling to be utilized to the full extent of available displacement while the vehicle is subjected to vibration, starting and stopping of the vehicle, chassis distortion, or any other loading that might put on the vehicle.

In an additional embodiment of the invention, the frame of the support structure includes top and bottom frame members each having spaced apart ends and first and second end frame members. The first and second end frame members are secured to a respective spaced apart end of said top and bottom frame members.

Preferably, the frame of the support structure further includes a first mounting bracket rigidly connected to a first end of the first side, a second mounting bracket rigidly connected to a second end of the first side, and a bracket support element which rigidly connects the first and second mounting brackets. It is highly preferred that the support structure has a first mounting point secured on the first mounting bracket and the second mounting point secured on the second mounting bracket such that the first and second mounting points are aligned coaxially.

The cooling system support structure preferably includes a first mounting point comprising a first outer bushing secured with respect to the first mounting bracket and a second mounting point comprising a second outer bushing secured with respect to the second mounting bracket, the first and second outer bushings being coaxially aligned. Further, a flexible inner bushing is coaxially secured within each of the first and second outer bushings. These flexible inner bushings are positioned to mate with corresponding chassis mounts on the vehicle chassis.

In an additional highly preferred embodiment of the present invention, the third mounting point includes a mounting point bracket rigidly connected to the second side of the frame and a flexible coupling comprising a connecting rod flexibly connected to the mounting point bracket and connecting the mounting point bracket to the vehicle chassis. The preferred connecting rod comprises a first rod end secured to a first rod outer bushing and a second rod end secured to a second rod outer bushing, such rod outer bushings positioned at opposite ends of the connecting rod with axes parallel one to the other and perpendicular to the axis of the connecting rod. The connecting rod also includes a flexible inner bushing coaxially secured within each rod outer bushing, the flexible inner bushing secured to the first rod outer bushing being positioned to mate with a mounting point bracket on the second side of the frame, and the flexible inner bushing secured to the second rod outer bushing positioned to mate with a corresponding chassis mount on the vehicle chassis.

When all or most of the cooling system components are mounted together as a unit, herein called a cooling system module, installation is both less costly and less time-consuming. When the module is flexibly mounted using the three point mounting arrangement of this invention, the components of the cooling system are subjected to much less stress, shock, and vibration, resulting in longer component life.

The cooling system may be positioned at a remote location with respect to the engine such that vibrations from the engine will not be transmitted directly to the cooling system. Further, by having the cooling system positioned at a location remote from the engine, vibrations from the engine and the chassis may dissipated along the length of the chassis.

BRIEF DESCRIPTION OF THE DRAWINGS

The drawings furnished herewith illustrate a preferred construction of the present invention in which the above advantages and features are clearly disclosed as well as others which will be readily understood from the following description of the illustrated embodiment. In the drawings:

FIG. 8a is a section view of a third mounting point and a flexible coupling in accordance with the present invention, taken along section 8a—8a shown in FIG. 8;

DETAILED DESCRIPTION OF PREFERRED EMBODIMENTS

Figure 1:
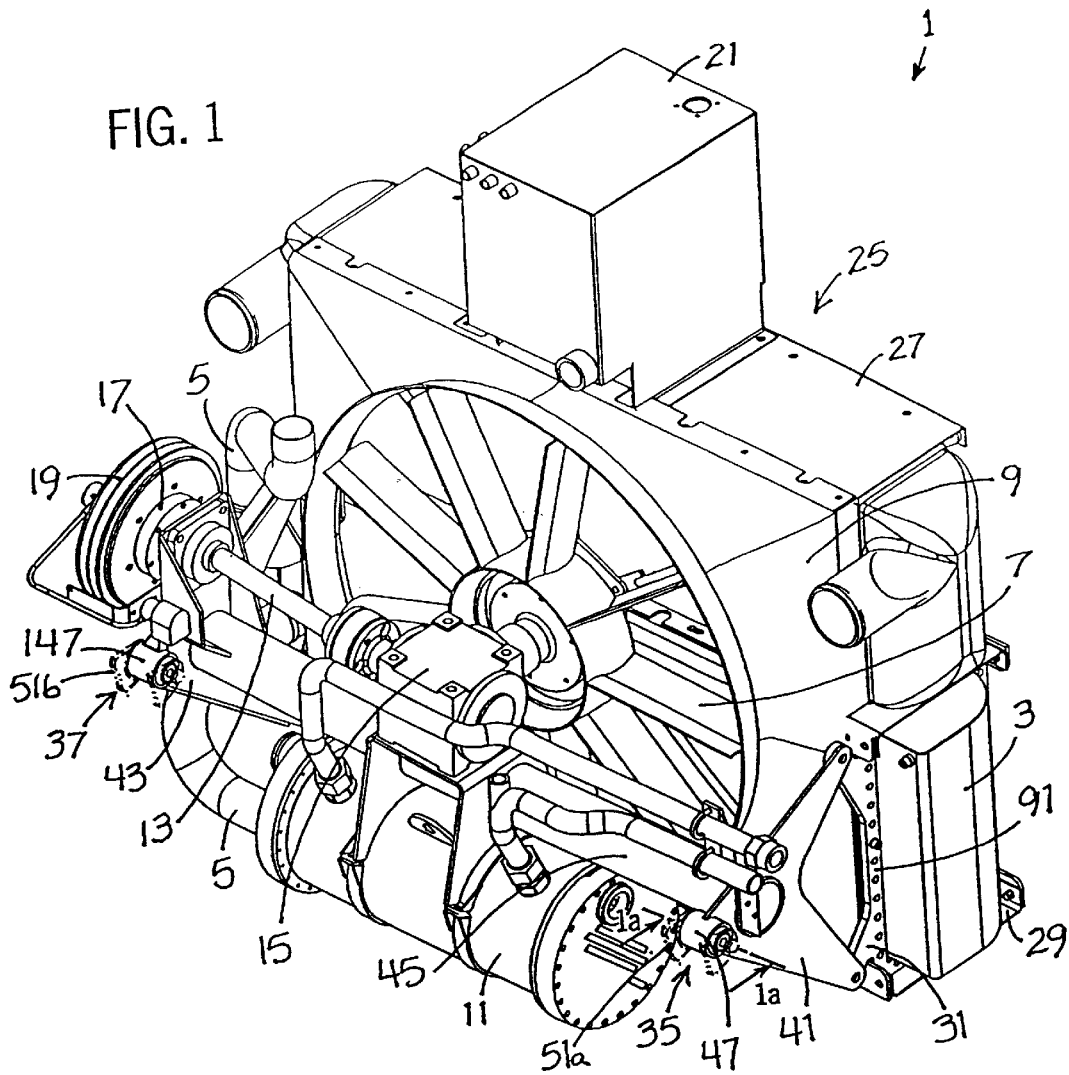
FIG. 1 is a perspective view of a vehicle cooling system in accordance with the present invention.
Figure 2:
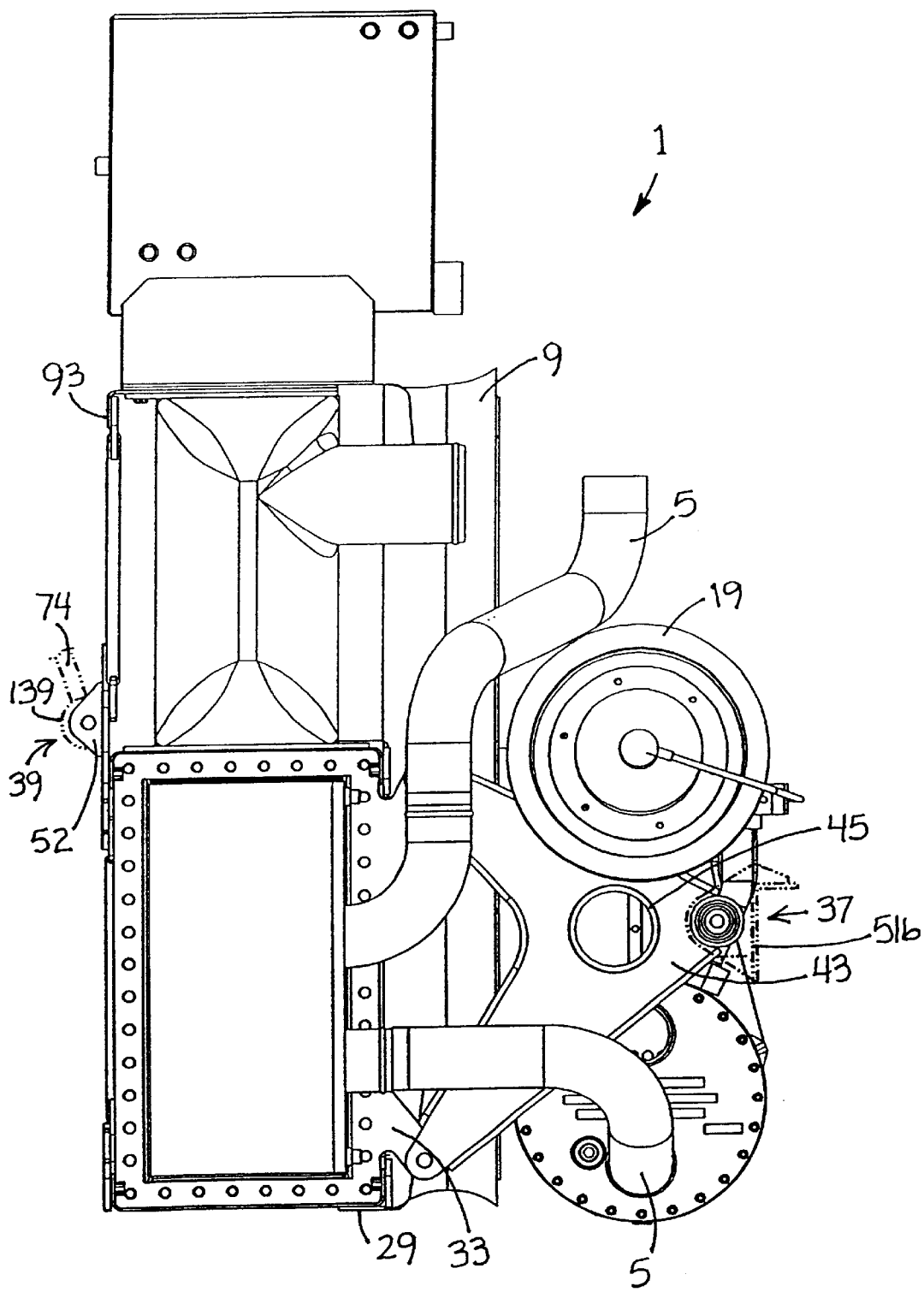
FIG. 2 is a rear elevation view of the vehicle cooling system of FIG. 1.
Figure 3:
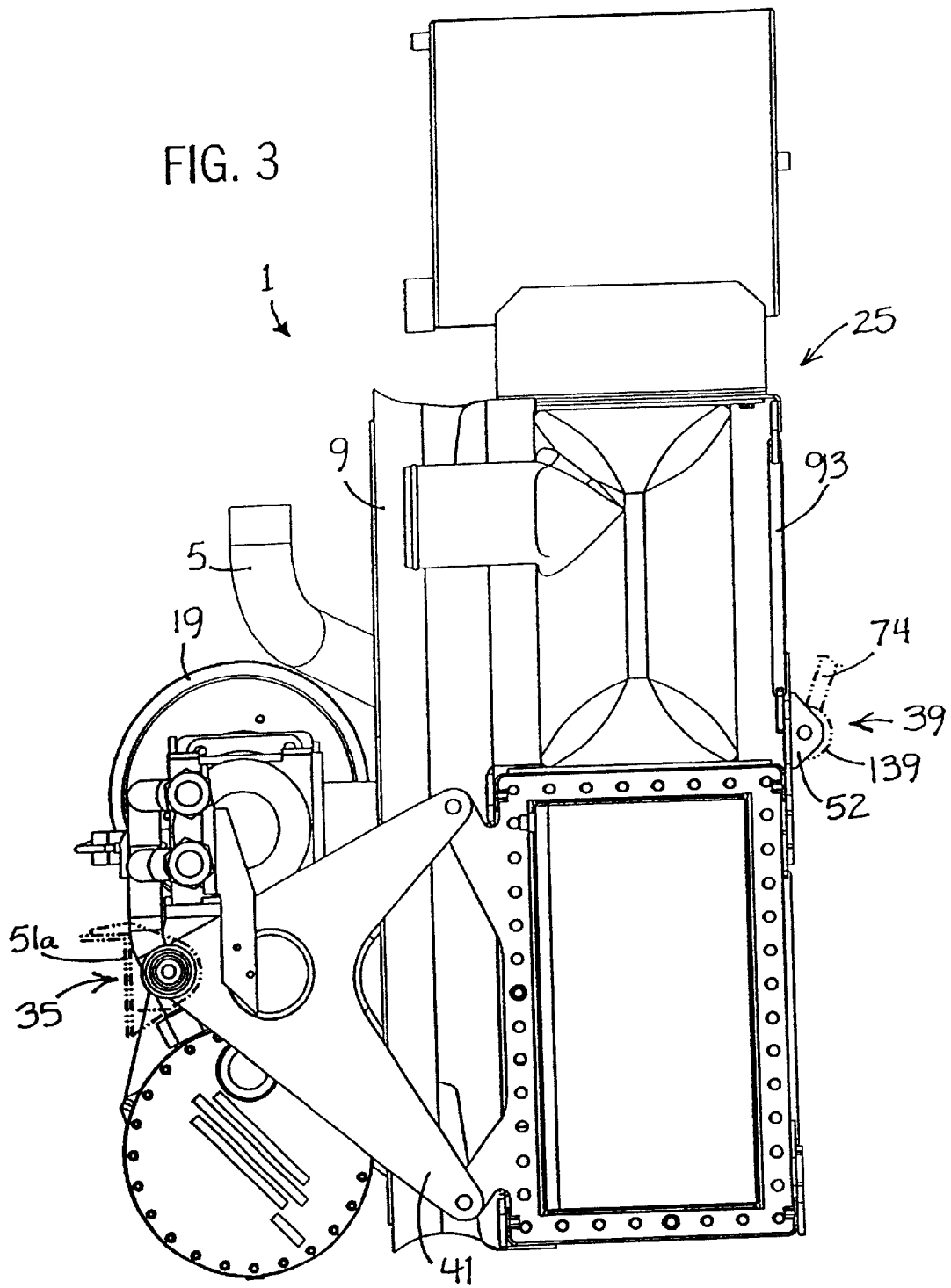
FIG. 3 is a front elevation view of the vehicle cooling system of FIG. 1.

FIG. 1 shows a perspective view of a preferred embodiment of an exemplary cooling system module 1 in accordance with the present invention. The embodiment shown is intended for use in motor vehicles such as buses and includes a number of cooling system components, including: radiator 3, fluid conduits 5, fan 7, fan shroud 9, transmission oil cooler 11, fan drive shaft 13, gear box 15, clutch 17, drive pulley 19, and expansion tank 21. In this embodiment, cooling system frame 25 includes top frame member 27, bottom frame member 29, first end frame member 31, and second end frame member 33 (FIG. 2).

Figure 4:
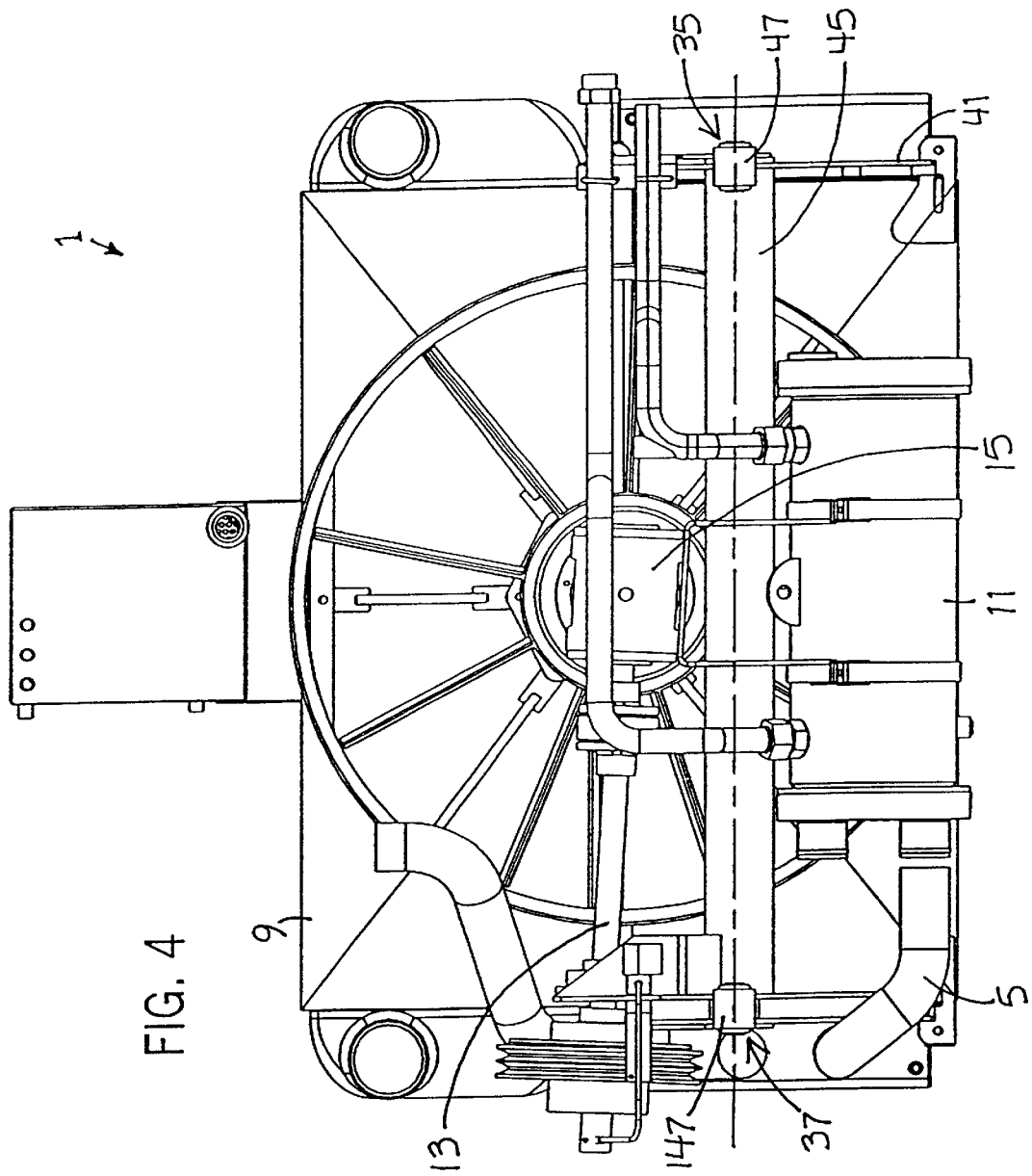
FIG. 4 is a side elevation view of a first side of the vehicle cooling system of FIG. 1.
Figure 5:
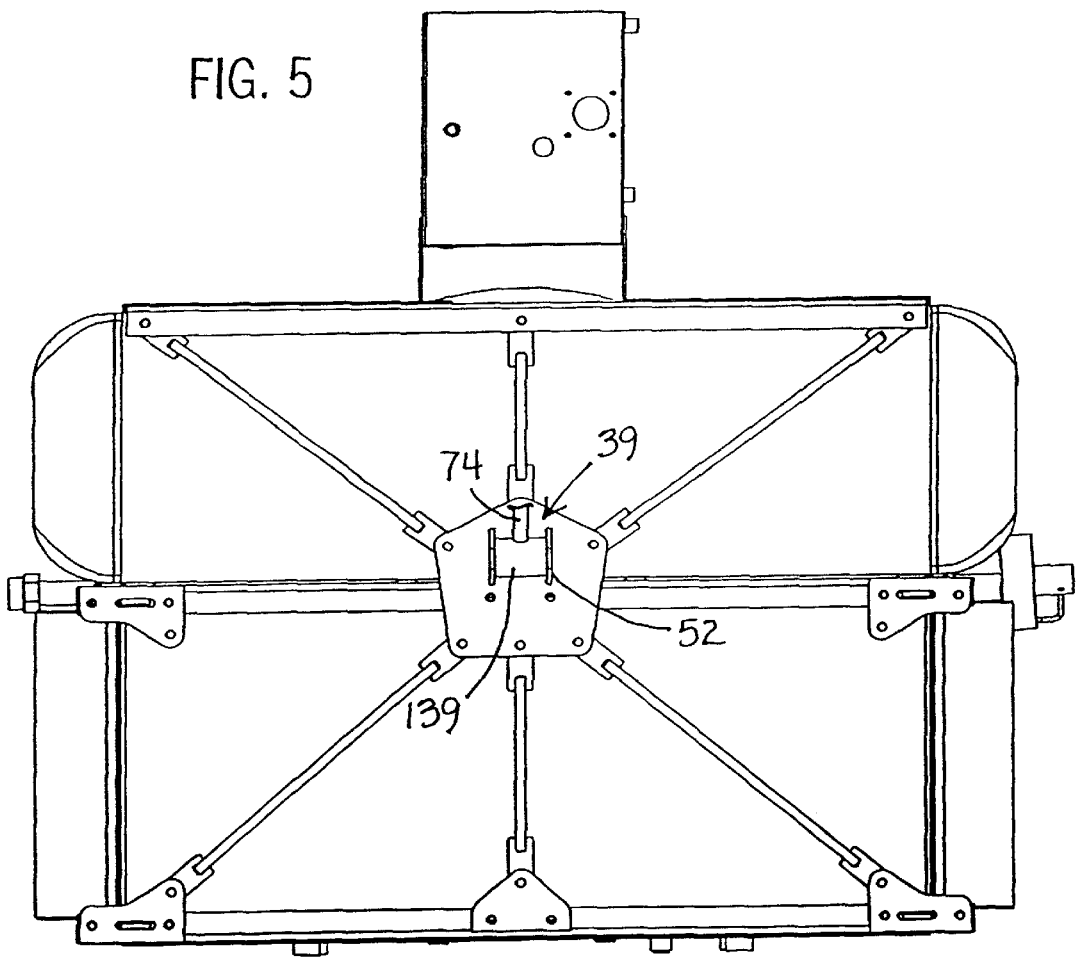
FIG. 5 is a side elevation view of a second, opposite side of the vehicle cooling system of FIG. 1.
Figure 6:
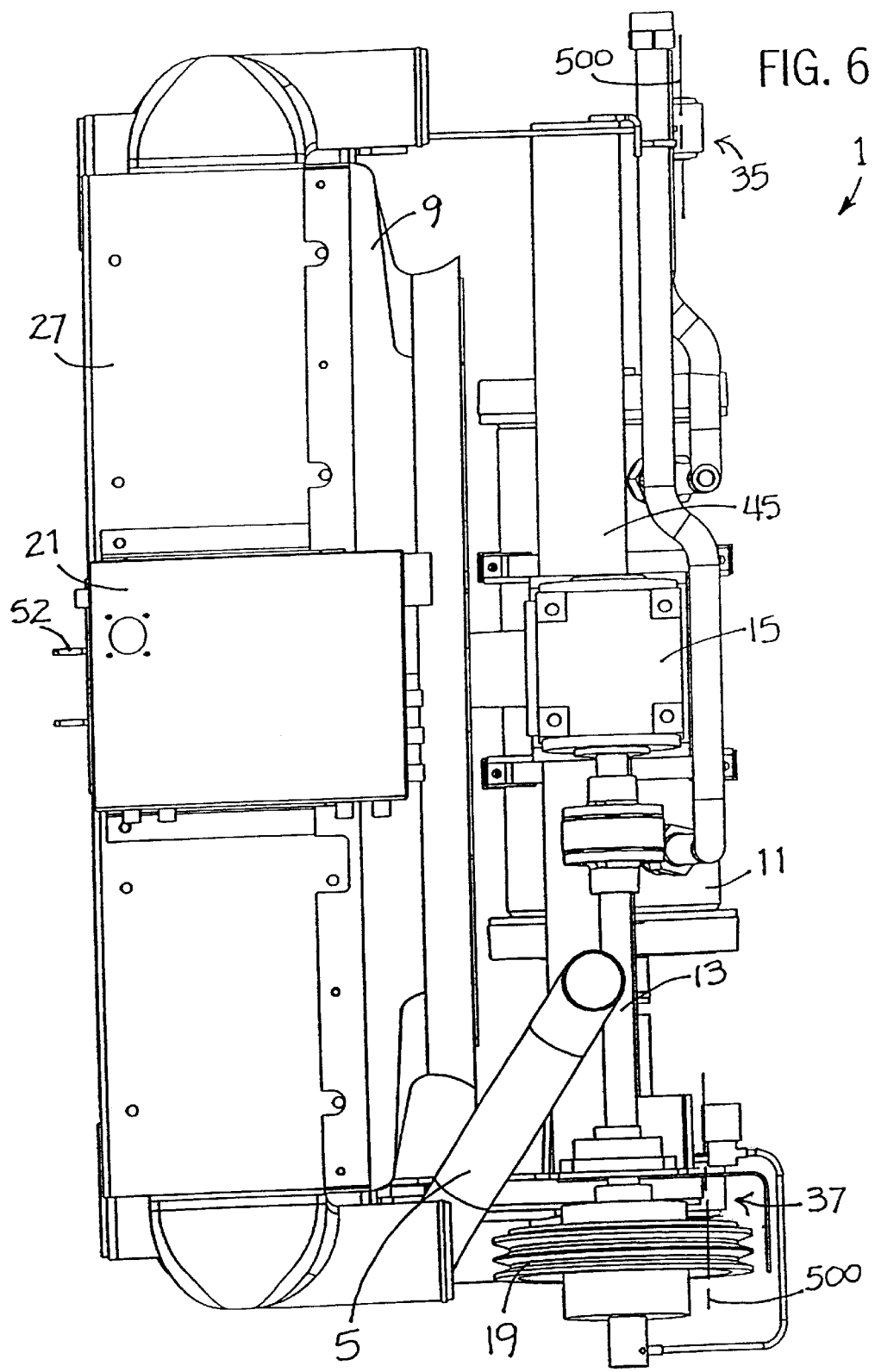
FIG. 6 is a top plan view of the vehicle cooling system of FIG. 1.
Figure 7:
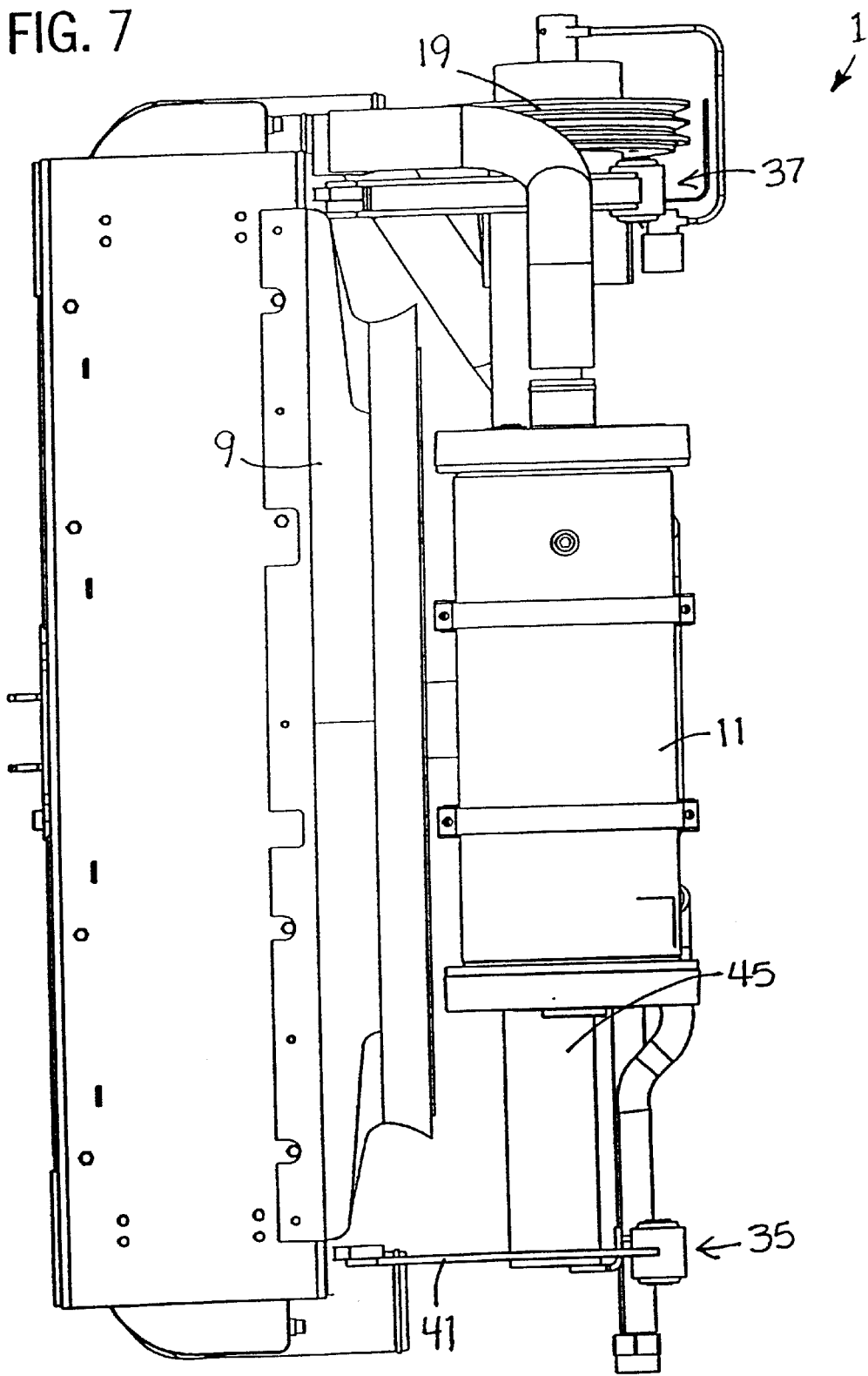
FIG. 7 is a bottom plan view of the vehicle cooling system of FIG. 1.

Cooling system frame 25 is supported by first mounting point 35, second mounting point 37, and third mounting point 39. First mounting point 35 is secured to first side 91 of frame 25 by first mounting bracket 41, and second mounting point 37 is secured to first side 91 of frame 25 by second mounting bracket 43. First and second mounting brackets 41 and 43 are connected one to the other by bracket support element 45. First mounting bracket 41 and second mounting bracket 43 are positioned such that first mounting point 35 and second mounting point 37 are coaxially aligned along axis 500 (FIGS. 4 and 6).

Figure 1A:
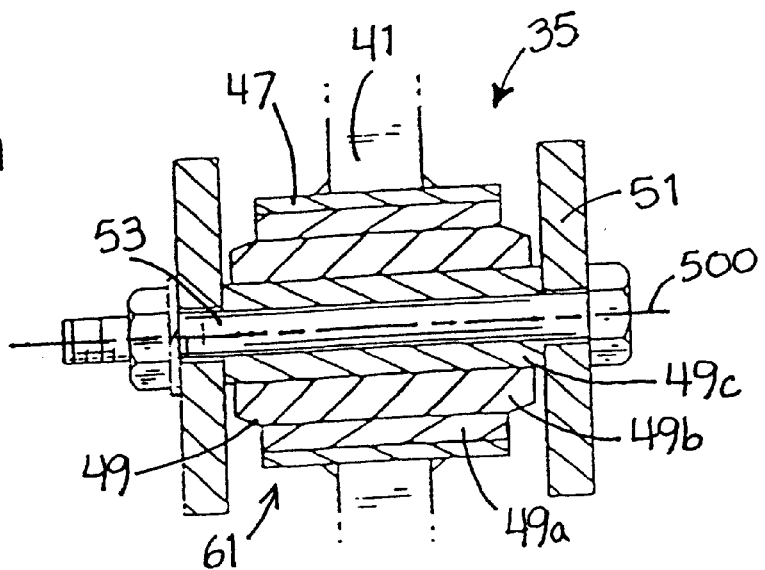
FIG. 1a is a section view of a first or second mounting point and a flexible coupling in accordance with the present invention, taken along section 1a—1a shown in FIG. 1.
Figure 10:
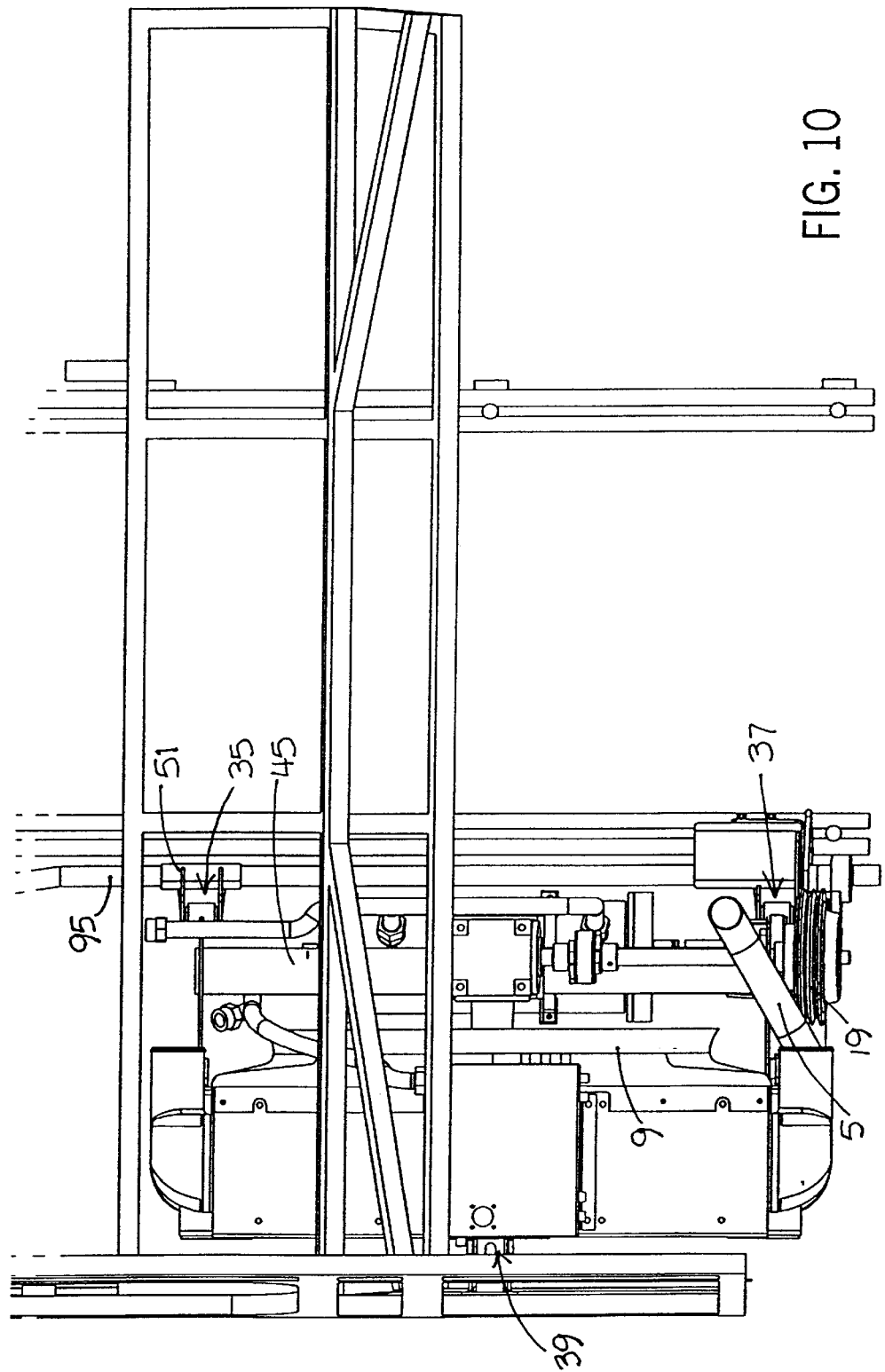
FIG. 10 is a top plan view of the cooling system module of FIG. 1 mounted within the vehicle frame.

The structure of first mounting point 35 is shown in FIG. 1a. Second mounting point 37 is identical to first mounting point 35 and therefore it will be understood that the description with respect to first mounting point 35 also applies to second mounting point 37. First mounting point 35 includes outer bushing 47 secured by welding to first mounting bracket 41. Flexible inner bushing 49 is press-fit into outer bushing 47, and bolt 53 holds first mounting point 35 to vehicle chassis 95 (FIG. 8 and FIG. 10) through chassis mount 51a. Preferred flexible inner bushing 49 is shown having three concentric members. In the preferred embodiment shown, flexible inner bushing 49 is a center bonded bushing with inner and outer concentric steel members 49c and 49a respectively, sandwiched around an elastomeric (such as rubber) member 49b. The structure of flexible inner bushings 149 and 249 is identical to that of flexible inner bushings 49.

Figure 1B:
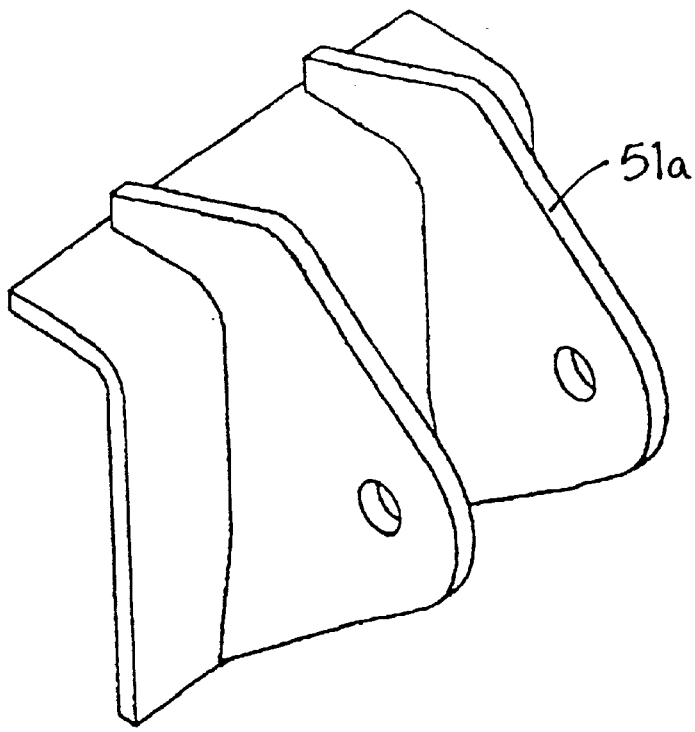
FIG. 1b is a perspective view of a chassis mount.

FIG. 1b is a perspective view of chassis mount 51a. First, second, and third mounting points 35, 37, and 39 respectively, are all connected to vehicle chassis 95 through chassis mounts 51a–c. In the embodiment shown in the figures, first and second mounting points 35 and 37 are mounted in similar fashion to chassis mounts 51a, 51b while third mounting point 39 is connected to vehicle chassis 95 through connecting rod 75, described below with respect to FIG. 8.

Figure 8:
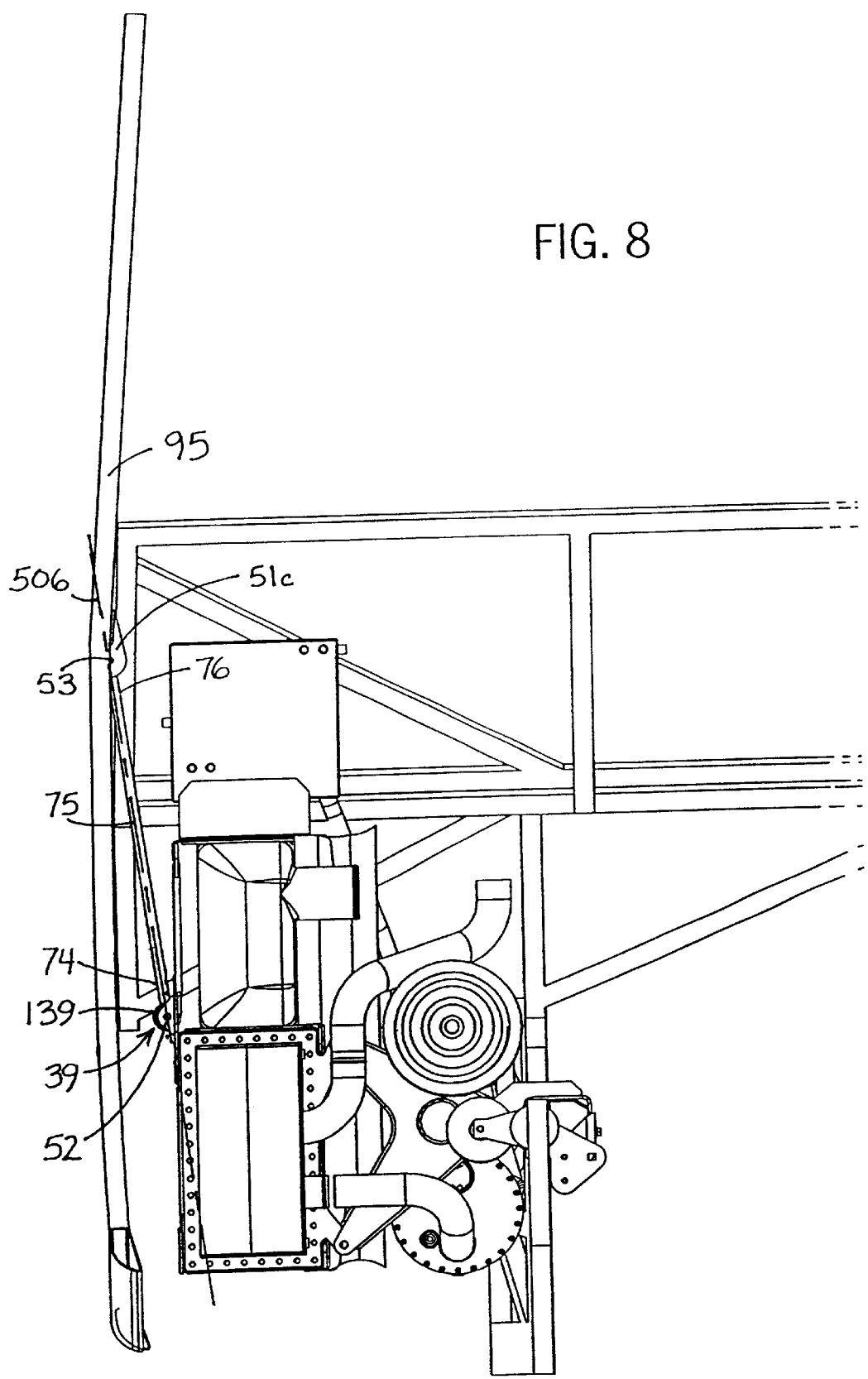
FIG. 8 is a rear elevation view of the vehicle cooling system of FIG. 1 mounted within a vehicle chassis.
Figure 9:
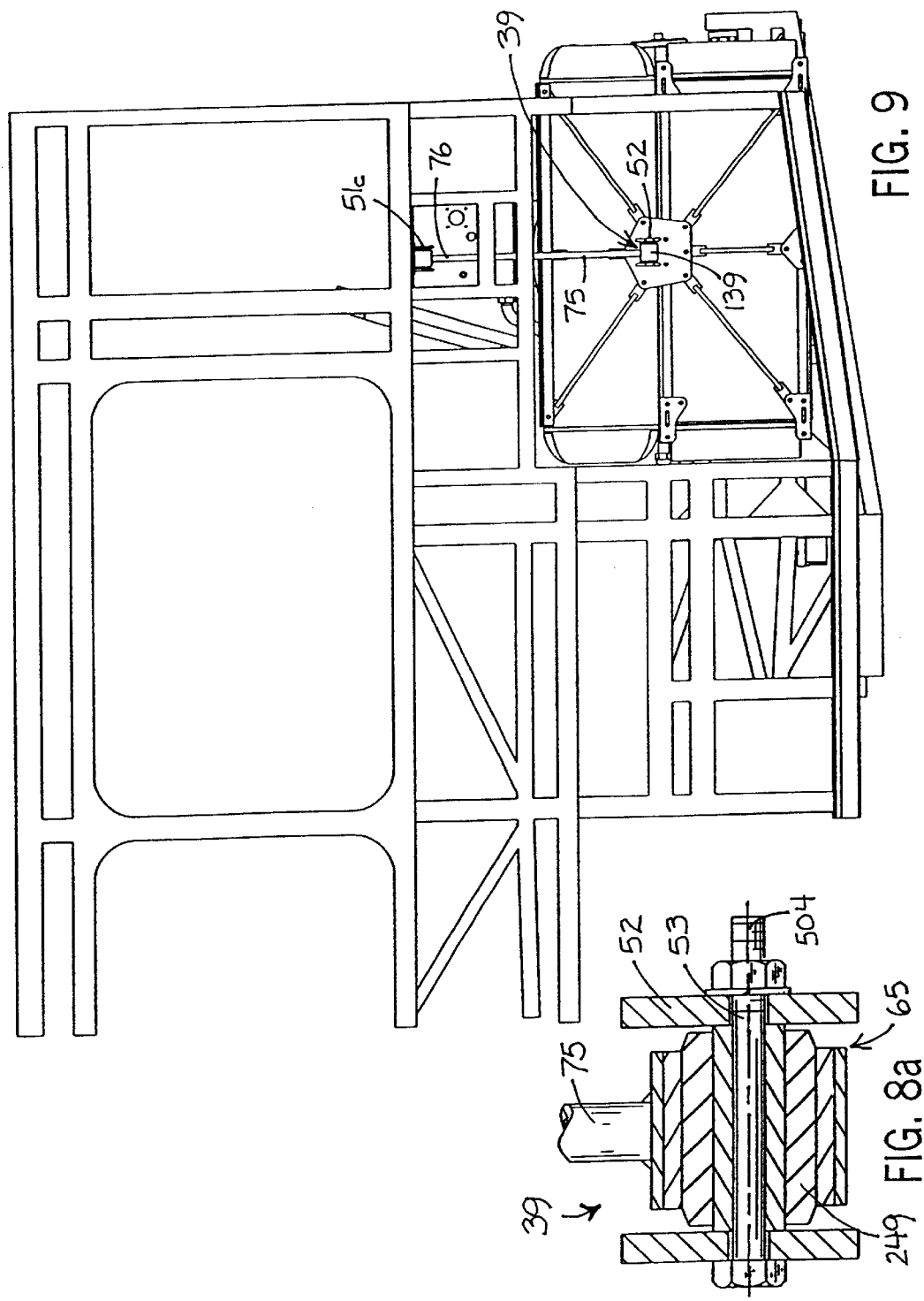
FIG. 9 is a side elevation view of the cooling system module of FIG. 1 mounted within the vehicle frame.

Third mounting point 39 is shown in FIGS. 2, 3, 5, 6, 7, 8, 8a, 9, and 10. Third mounting point 39 is secured to second side 93 of frame 25 through a mounting point bracket 52 similar to chassis mounts 51a–c. Third mounting point 39 is shown additionally in FIG. 3 and FIGS. 5 through 10. FIG. 8 shows connecting rod 75 connecting third mounting point 39 to vehicle chassis 95.

FIG. 8a is a sectional detail of third mounting point 39 with flexible coupling 65, showing first rod end 74 secured to mounting point bracket 52 through outer bushing 139. Flexible inner bushing 249 is press-fit into rod outer bushing 139, and bolt 53 secures the outer and inner bushings 139 and 249 to bracket 52. The second rod end 76 (FIG. 8) is identical to first rod end 74 and is connected to chassis mount 51c in an identical manner to that shown in FIG. 8a for first rod end 74.

As shown in FIG. 8, axis 506 of connecting rod 75 is perpendicular to common axis 504 of third mounting point 39, rod outer bushing 139 and flexible inner bushing 249, shown in FIG. 8a. In identical fashion, at second rod end 76, the rod outer bushing (not shown) and its corresponding flexible inner bushing have an axis (not shown) parallel to axis 504. Axis 504 and the corresponding axis at second rod end 76 are perpendicular to the plane of the page on which FIG. 8 is shown and axis 506 is in the plane of this same page.

In operation, module 1 is positioned as a single unit within vehicle chassis 95. Preferably, first and second flexible couplings 61, 63 are aligned with respective chassis mounts 51a, 51b and are connected to the chassis mounts 51a, 51b with bolts 53 inserted through the respective mount and inner bushings 49, 149. Third mounting point 39 is secured to flexible coupling 65 at first rod end 74 by bolt 53 inserted through mounting point bracket 52 and inner bushing 249. Second rod end 76 is secured to chassis mount 51c by a bolt 53 inserted through mount 51c and flexible coupling (identical to coupling 65) at second rod end 76. All necessary interconnections between the components comprising the module 1 and the vehicle are then made. For example, the fluid conduits 5 carrying engine coolant between the engine and the radiator 3 are connected.

In a similar fashion to installation, when maintenance is required, the cooling system module can be easily removed from the vehicle chassis 95.

As the vehicle is operated, the vehicle chassis 95 is subject to stress and displacement caused by movement and vibration of the vehicle. The three point mounting system enables module 1 to move because each mounting point has a rotational axis about which the respective flexible coupling 61, 63 and 65 is allowed to rotate and because the flexible couplings deform in response to both torsional and translational forces. As a result, the elements of the cooling system are subjected to only minimal stresses and displacements from the chassis, thereby extending the service life of the cooling system components.

While the principles of this invention have been described in connection with specific embodiments, it should be understood clearly that these descriptions are made only by way of example and are not intended to limit the scope of the invention.

What is claimed is:

1. In a cooling apparatus for a vehicle, the apparatus including a radiator and fluid conduits for carrying engine coolant from an engine to the radiator, the improvement comprising a cooling system frame with the radiator attached thereto, the frame having:

first and second sides;

first and second mounting brackets rigidly connected to opposite ends of the first side, the first and second mounting brackets rigidly connected with a bracket support element; and first, second and third mounting points, each mounting point including a flexible coupling for flexibly connecting the cooling system frame to the chassis of the vehicle, the first and second mounting points being attached to the first side and the third mounting point being attached to the second side.

2. The apparatus of claim 1 wherein the mounting points are positioned such that the vehicle cooling system is supported in a balanced state.

3. The apparatus of claim 1 wherein the first mounting point is secured on the first mounting bracket and the second mounting point is secured on the second mounting bracket, the mounting points being aligned coaxially.

4. The apparatus of claim 3 wherein:

the first mounting point comprises a first outer bushing secured with respect to the first mounting bracket;

the second mounting point comprises a second outer bushing secured with respect to the second mounting bracket, the second outer bushing being coaxially aligned with the first outer bushing; and a flexible inner bushing is coaxially secured within each outer bushing, each flexible inner bushing being positioned to mate with a corresponding chassis mount on the vehicle chassis.

5. In a cooling apparatus for a vehicle, the apparatus including a radiator and fluid conduits for carrying engine coolant from an engine to the radiator, the improvement comprising a cooling system frame with the radiator attached thereto, the frame having:

first and second sides; and a first mounting point including a first flexible coupling for flexibly connecting the cooling system frame to the chassis of the vehicle, the first mounting point being attached to the first side;

a second mounting point including a second flexible coupling for flexibly connecting the cooling system frame to the chassis of the vehicle, the second mounting point being attached to the first side; and a third mounting point including a third flexible coupling for flexibly connecting the cooling system frame to the chassis of the vehicle, the third mounting point comprising a mounting point bracket rigidly connected to the second side and a connecting rod flexibly connected to the mounting point bracket, the connecting rod connecting the mounting point bracket to the vehicle chassis.

6. The apparatus of claim 5 wherein the connecting rod comprises:

a first rod end secured to a first rod outer bushing defining a first bushing axis;

a second rod end secured to a second rod outer bushing defining a second bushing axis, the rod outer bushings being positioned at opposite ends of the connecting rod with the first and second bushing axes being parallel to one another and perpendicular to the axis of the connecting rod;

a first flexible inner bushing coaxially secured within the first rod outer bushing, the first flexible inner bushing being positioned to mate with the mounting point bracket; and a second flexible inner bushing coaxially secured within the second rod outer bushing, the second flexible inner bushing being positioned to mate with a corresponding chassis mount on the vehicle chassis.

7. In a cooling apparatus for a vehicle, the apparatus including a radiator and fluid conduits for carrying engine coolant from an engine to the radiator, the improvement comprising a cooling system frame with the radiator attached thereto; first, second and third mounting brackets rigidly connected to the frame at fixed positions; and first, second and third flexible couplings, each flexible coupling flexibly connecting a respective mounting bracket to the chassis of the vehicle.

8. The apparatus of claim 7 wherein the mounting brackets are positioned such that the vehicle cooling system is supported in a balanced state.

9. The apparatus of claim 7 wherein the cooling system frame has a first side and a second side, and the first and second mounting brackets are attached to the first side.

10. The apparatus of claim 9 wherein the third mounting bracket is attached to the second side.

11. The apparatus of claim 7 wherein the first and second mounting brackets are rigidly connected with a bracket support element.

12. The apparatus of claim 7 wherein the first and second mounting brackets each include a mounting point, the mounting points being aligned coaxially.

13. The apparatus of claim 12 wherein the first mounting point comprises a first outer bushing secured with respect to the first mounting bracket;

the second mounting point comprises a second outer bushing secured with respect to the second mounting bracket and coaxially aligned with the first outer bushing; and a flexible inner bushing is coaxially secured within each outer bushing, each flexible inner bushing being positioned to mate with a corresponding chassis mount on the vehicle chassis.

14. The apparatus of claim 7 wherein the third flexible coupling comprises a connecting rod flexibly connected to the third mounting bracket, the connecting rod connecting the third mounting point bracket to the vehicle chassis.

15. The apparatus of claim 14 wherein the connecting rod comprises:

a first rod end secured to a first rod outer bushing defining a first bushing axis;

a second rod end secured to a second rod outer bushing defining a second bushing axis, the rod outer bushings being positioned at opposite ends of the connecting rod with the first and second bushing axes being parallel to one another and perpendicular to the axis of the connecting rod;

a first flexible inner bushing coaxially secured within the first rod outer bushing, the first flexible inner bushing being positioned to mate with the third mounting bracket; and a second flexible inner bushing coaxially secured within the second rod outer bushing, the second flexible inner bushing being positioned to mate with a corresponding chassis mount on the vehicle chassis.

* * * * *